US012722288B2

(12) United States Patent
Hasegawa et al.

(10) Patent No.: US 12,722,288 B2

(45) Date of Patent: Sep. 1, 2026

(54) ROBOT SYSTEM

(71) Applicant: KAWASAKI JUKOGYO KABUSHIKI KAISHA, Kobe (JP)

(72) Inventors: Takahiro Hasegawa, Kobe (JP); Takashi Takatori, Kobe (JP); Ryusuke Nishikawa, Kobe (JP); Hiroki Suemoto, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 18/724,503

(22) PCT Filed: Nov. 29, 2022

(86) PCT No.: PCT/JP2022/043850

§ 371 (c)(1),
(2) Date: Jun. 26, 2024

(87) PCT Pub. No.: WO2023/127373

PCT Pub. Date: Jul. 6, 2023

(65) Prior Publication Data

US 2025/0091200 A1 Mar. 20, 2025

(30) Foreign Application Priority Data

Dec. 28, 2021 (JP) ................................ 2021-213617

(51) Int. Cl.

| | |
|---|---|
| ***B25J 9/16*** | (2006.01) |
| ***B25J 13/08*** | (2006.01) |
| ***B25J 15/06*** | (2006.01) |

(52) U.S. Cl.

CPC .......... *B25J 9/1612* (2013.01); *B25J 13/081* (2013.01); *B25J 15/0616* (2013.01)

(58) Field of Classification Search

CPC .... B25J 9/1612; B25J 13/081; B25J 15/0616; B25J 13/084; G05B 2219/39567; G05B 2219/40625

See application file for complete search history.

(56) References Cited

U.S. PATENT DOCUMENTS

| | | | | |
|---|---|---|---|---|
| 6,086,321 | A * | 7/2000 | Takahashi ............. | B25J 9/1612 414/793 |
| 2012/0296472 | A1* | 11/2012 | Nagai ................... | B25J 13/085 700/258 |

(Continued)

FOREIGN PATENT DOCUMENTS

| | | | |
|---|---|---|---|
| JP | H08-243961 | A | 9/1996 |
| JP | 2021-104562 | A | 7/2021 |
| WO | 2018/105121 | A1 | 6/2018 |

*Primary Examiner* — Wade Miles

*Assistant Examiner* — James Brian Chin

(74) *Attorney, Agent, or Firm* — Oliff PLC

(57) ABSTRACT

A robot system includes a robot, an attraction pad, a sensor, and a controller. The robot includes a hand whose orientation is changeable. The attraction pad is attached to the hand, attracts a workpiece, and holds the workpiece. The sensor is attached to the hand, includes a detection surface, and detects contact between the detection surface and the workpiece. The controller can determine whether the workpiece has been brought into surface contact with the detection surface based on a result of detection made by the sensor and changes the orientation of the hand, until the workpiece makes surface contact with the detection surface, and then makes the attraction pad hold the workpiece.

9 Claims, 9 Drawing Sheets

(56) References Cited

U.S. PATENT DOCUMENTS

| | | | | |
|---|---|---|---|---|
| 2014/0371871 | A1* | 12/2014 | Farina | A61F 2/54 623/24 |
| 2015/0019013 | A1* | 1/2015 | Rose | B25J 13/08 702/41 |
| 2019/0351549 | A1* | 11/2019 | Suzuki | B25J 15/0042 |
| 2019/0389082 | A1 | 12/2019 | Higo | |
| 2020/0114508 | A1* | 4/2020 | Kawabata | B25J 15/10 |
| 2021/0213607 | A1* | 7/2021 | Sansfaçon | F16H 19/04 |
| 2021/0311082 | A1* | 10/2021 | Tesluk | G01N 35/1011 |
| 2023/0405639 | A1* | 12/2023 | Holopainen | B07C 5/36 |
| 2023/0405842 | A1* | 12/2023 | Khin | B25J 15/12 |
| 2024/0033945 | A1* | 2/2024 | Uetake | B25J 9/1638 |
| 2025/0091200 | A1* | 3/2025 | Hasegawa | B25J 9/1612 |

* cited by examiner

FIG. 2

15
S102-S104
22
51
32a
52
15
S107
51
52
32a
22
15
S107
51
52
32a
22
15
22
52
S102-S104
51
Height Direction
32a

FIG. 9

ROBOT SYSTEM

TECHNICAL FIELD

The present application mainly relates to a robot system that attracts and holds a workpiece using an attraction pad.

BACKGROUND ART

PTL 1 discloses a picking apparatus using an attraction hand to attract a workpiece. The attraction hand uses magnetic force generated by a magnet to attract the workpiece. A shaft is fixed to the magnet. The magnet and the shaft are covered by a cover. The cover can slide vertically with respect to the magnet and the shaft. When the attraction hand is not sticking to the workpiece, the cover is located at a lower side under its own weight. As the attraction hand approaches the workpiece, the bottom surface of the cover is pushed upward by the workpiece and the cover slides upward with respect to the magnet and the shaft.

An optical sensor is attached to the attraction hand. The optical sensor includes a light emitter and a light receiver. The optical sensor detects whether the light receiver received the light emitted from the light emitter. The light emitter is fixed to the cover. The light receiver is fixed to the shaft.

When the attraction hand is not sticking to the workpiece, the light emitter on the shaft and the light receiver on the cover are facing each other. On the other hand, when the attraction hand approaches the workpiece, the bottom surface of the cover is pushed upward by the workpiece and the cover slides upward with respect to the magnet and the shaft. As a result, the light receiver ceases to receive the light from the light emitter. That is, the picking apparatus of the PTL 1 can detect that the attraction hand is located close to the workpiece based on the detected value obtained by the optical sensor. When the picking apparatus detects the approach of the attraction hand to the workpiece, the picking apparatus slows down a descending speed of the attraction hand. Accordingly, the impact that the picking apparatus gives on the workpiece can be reduced.

PRIOR-ART DOCUMENTS

Patent Documents

PTL 1: Japanese Patent Application Publication No. 2021-104562

SUMMARY OF THE INVENTION

Problems to be Solved by the Invention

PTL 1 does not discloses changing the orientation of the hand with respect to the workpiece. Therefore, depending on the type of the workpiece and of the attraction hand that are to use, the workpiece may not be properly attracted and held.

The present application is made in view of the situation described above and its main purpose is to provide a robot system that can attract and hold a workpiece properly by changing an orientation of a hand with respect to the workpiece.

Means for Solving the Problems

The problem to be solved by the present application is as described above. The means to solve this problem and the effects thereof will be described below.

An aspect of the present application provides a robot system with a configuration described below. That is, the robot system includes a robot, an attraction pad, a sensor, and a controller. The robot includes a hand whose orientation is changeable. The attraction pad is attached to the hand, attracts a workpiece, and holds the workpiece. The sensor is attached to the hand, includes the detection surface, and detects contact between the detection surface and the workpiece. The controller can determine whether the workpiece has been brought into surface contact with the detection surface based on a result of detection made by the sensor and changes the orientation of the hand, until the workpiece makes surface contact with the detection surface, and then makes the attraction pad hold the workpiece.

Effects of the Invention

According to the present application, the robot system can attract and hold the workpiece properly by changing the orientation of the hand with respect to the workpiece.

BRIEF DESCRIPTION OF THE DRAWINGS

Figure 2:
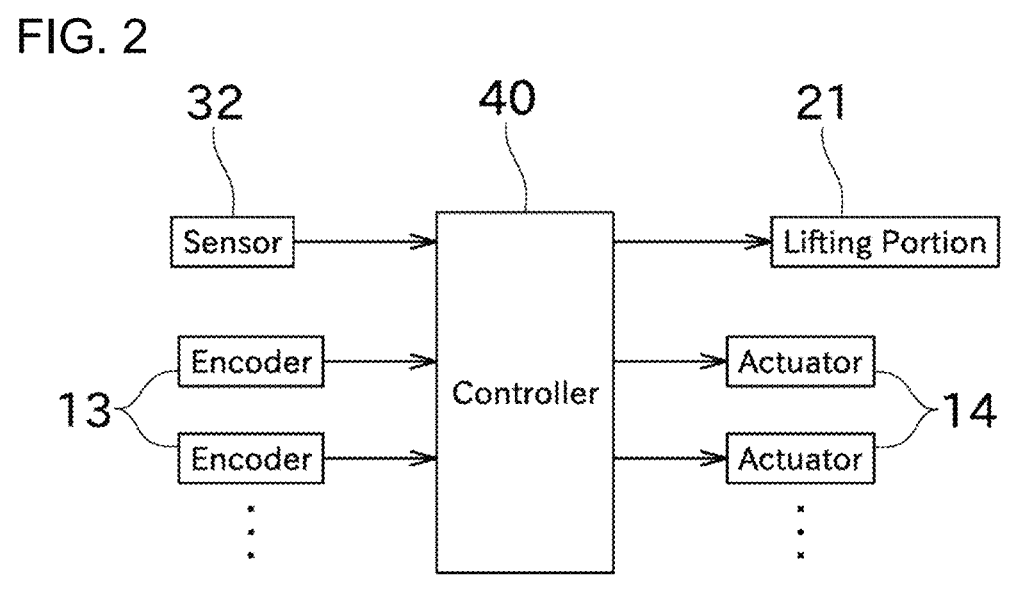

FIG. 2 is a block diagram of a robot system.

FIG. 9 is a side view showing an example where a container is arranged in a tilted manner.

EMBODIMENT FOR CARRYING OUT THE INVENTION

An embodiment of the present application will be described below with reference to the drawings. First, with reference to FIG. 1 and FIG. 2, a robot system 1 will be described.

Figure 1:
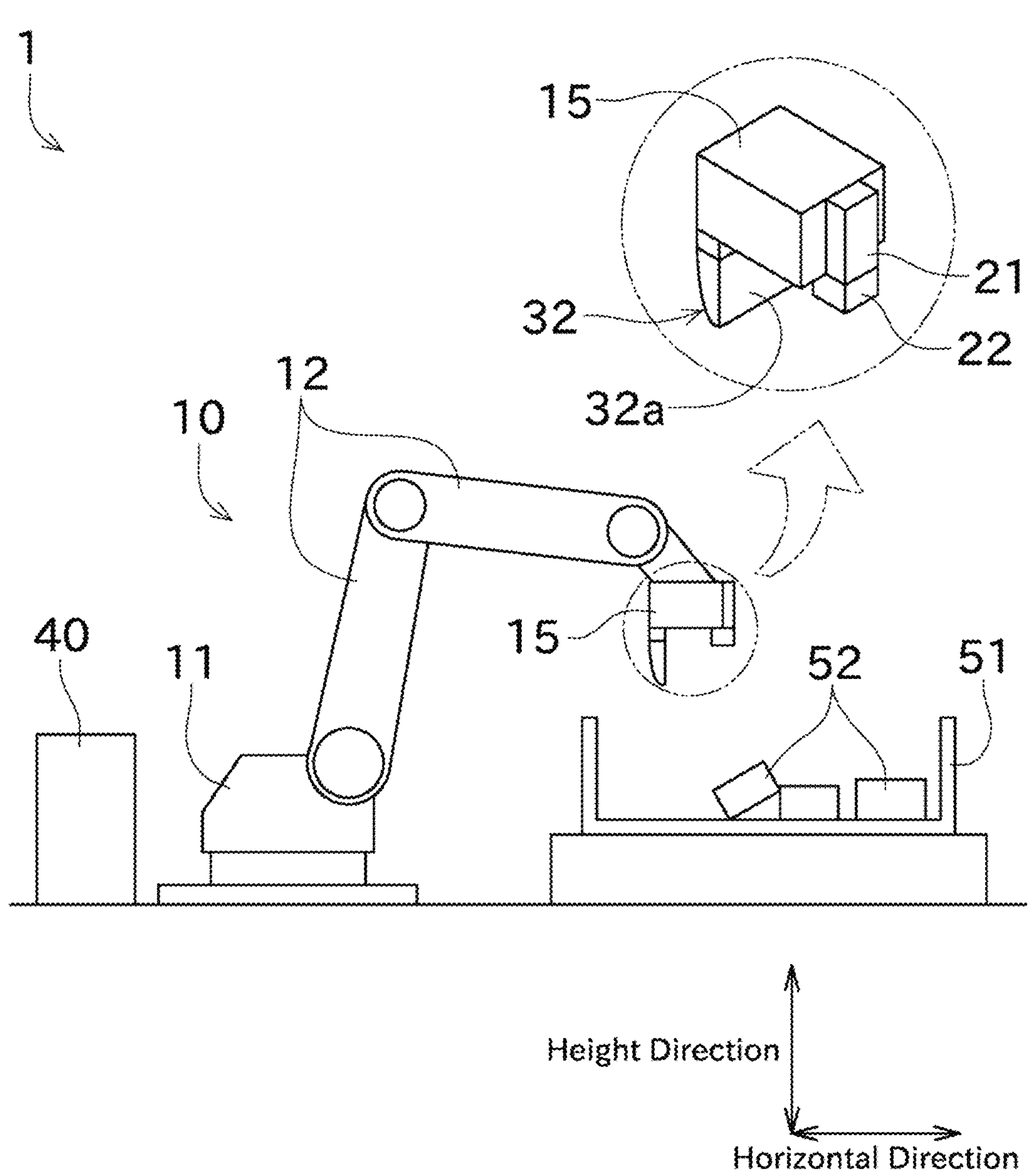
FIG. 1 is a side view of a robot system according to one embodiment of the present application.

The robot system 1 is arranged in an institution, such as a factory or a warehouse. The robot system 1 includes a robot 10 and a controller 40. The robot system 1 is a system for making the robot 10 perform a task. As shown in FIG. 1, the task that the robot 10 performs is a picking-up task to handle a workpiece 52 which is a work object. The picking-up task is a task to pick up the workpiece 52 and transfer it to another location. In the present embodiment, the workpiece 52 is placed in a container 51. However, the workpiece 52 may be placed in another containing unit or may be placed on a conveyor.

The shape of the workpiece 52 of the present embodiment is cuboid. In the present specification, the cuboid shape is not limited to an exact cuboid shape, but the term includes a shape that is substantially cuboid. The shape of the workpiece 52 is not limited to cuboid shape. Though, it preferably includes more than one plane on its outer surface.

As shown in FIG. 1, the robot 10 includes a base 11, arms 12, and a hand 15. The robot 10 of the present embodiment is a vertical articulated type. However, the robot 10 is not limited to the vertical articulated type, but it may be various types as long as it can change the orientation of the hand 15.

The base 11 is fixed to a suitable location in the institution, such as the surface of the floor, a supporting base, or the surface of the ceiling. The proximal end of the arms 12 is connected to the base 11. The arms 12 are connected to each other. The hand 15 is connected to the distal end of the arms 12.

An encoder 13 and an actuator 14 are attached to each point where these members are connected. The encoder 13 detects displacement of one member with respect to the other member. When one member rotates with respect to the other member, a rotary encoder is used. When one member moves linearly with respect to the other member, a linear encoder is used. The detected value obtained by the encoder 13 is output to the controller 40. The actuator 14 is, for example, an electronic motor or an electric cylinder and it generates power to move one member with respect to the other member. The actuator 14 is controlled by the controller 40.

The controller 40 is a computer that includes a processing apparatus, such as a CPU, a storage apparatus, such as a HDD, a SSD, and a flash memory, and a wired or wireless communicating apparatus. The controller 40 can perform various functions when the processing apparatus executes a program stored in the storage apparatus. The controller 40 can also send and receive data using the communicating apparatus. The data that the controller 40 receives is, for example, the detected value obtained by the encoder 13 or by another sensor. The data that the controller 40 sends is, for example, a signal to operate the actuator 14. The controller 40 can change the position and the orientation of the hand 15 by operating the actuator 14 with reference to the detected value obtained by the encoder 13.

As shown in FIG. 1, a lifting apparatus 21, an attraction pad 22, and a sensor 32 are attached to the hand 15. As the position and orientation of the hand 15 is changed, the positions and orientations of the lifting apparatus 21, the attraction pad 22, and the sensor 32 are also changed.

The lifting apparatus 21 is an actuator, such as a cylinder. The lifting apparatus 21 can slide with respect to the hand 15 under the power of the actuator. The lifting apparatus 21 is controlled by the controller 40. The attraction pad 22 is attached to one end of the lifting apparatus 21. Accordingly, the attraction pad 22 can be raised and lowered.

The attraction pad 22 attracts the workpiece 52. The attraction pad 22 of the present embodiment is a vacuum suction type. The vacuum suction type is a type in which an article is attracted and held by negative pressure generated within the pad. The attraction pad 22 is not limited to the vacuum suction type. For example, when the workpiece 52 is magnetic, the workpiece 52 may be attracted by a magnet.

The sensor 32 includes a detection surface **32*a*. The sensor 32 detects contact between the detection surface 32*a* and the workpiece 52. On the detection surface 32*a*, more than one minute tactile sensor is arranged in a planar way. The tactile sensors are, for example, capacitive, electrical-resistive, or piezoelectric. Each tactile sensor outputs the magnitudes of the received force as an electrical signal. Based on the detected value obtained by each tactile sensor, the contact between the detection surface 32*a* and the workpiece 52 can be determined. When the attraction pad 22 sticks to the top face of the workpiece 52, the sensor 32 contacts with the side face of the workpiece. In other words, the attracted face of the workpiece 52 and the detected face of the workpiece 52** are different faces. Instead of the tactile sensor, a contact sensor that detects whether an object has been brought into contact may be used. The contact sensor is, for example, a limit switch.

The sensor 32 is flexible. That is, when the sensor 32 makes contact with the workpiece 52 while the hand 15 is moving, the sensor bends along the workpiece 52 while detecting the contact with the workpiece 52. Accordingly, since strong force will not be applied to the sensor 32, the sensor 32 is prevented from being damaged. The sensor 32 may not be flexible.

Next, with reference to FIG. 3 to FIG. 5, a process of the robot 10 searching for the workpiece 52 will be described below.

In the present embodiment, the workpiece 52 is placed irregularly in the container 51. In such a situation, it is difficult to pick up the workpiece 52 properly using the teaching playback method, in which the robot 10 is taught in advance and operates as taught. Therefore, in the present embodiment, the workpiece 52 is searched for while moving the hand 15 and the workpiece 52 is picked up when the workpiece 52 is detected.

Figure 3:
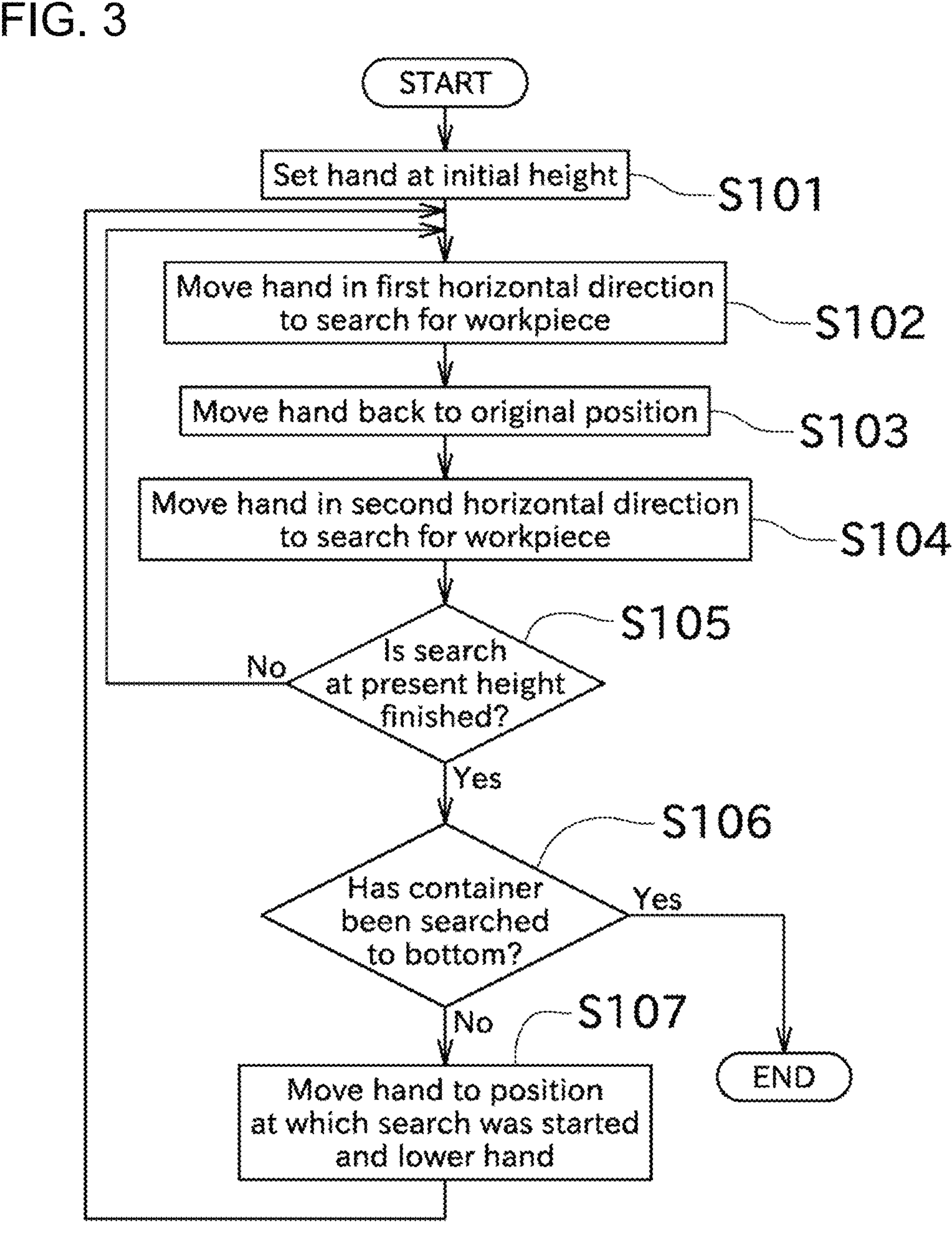
FIG. 3 is a flowchart of workpiece search.
Figure 4:
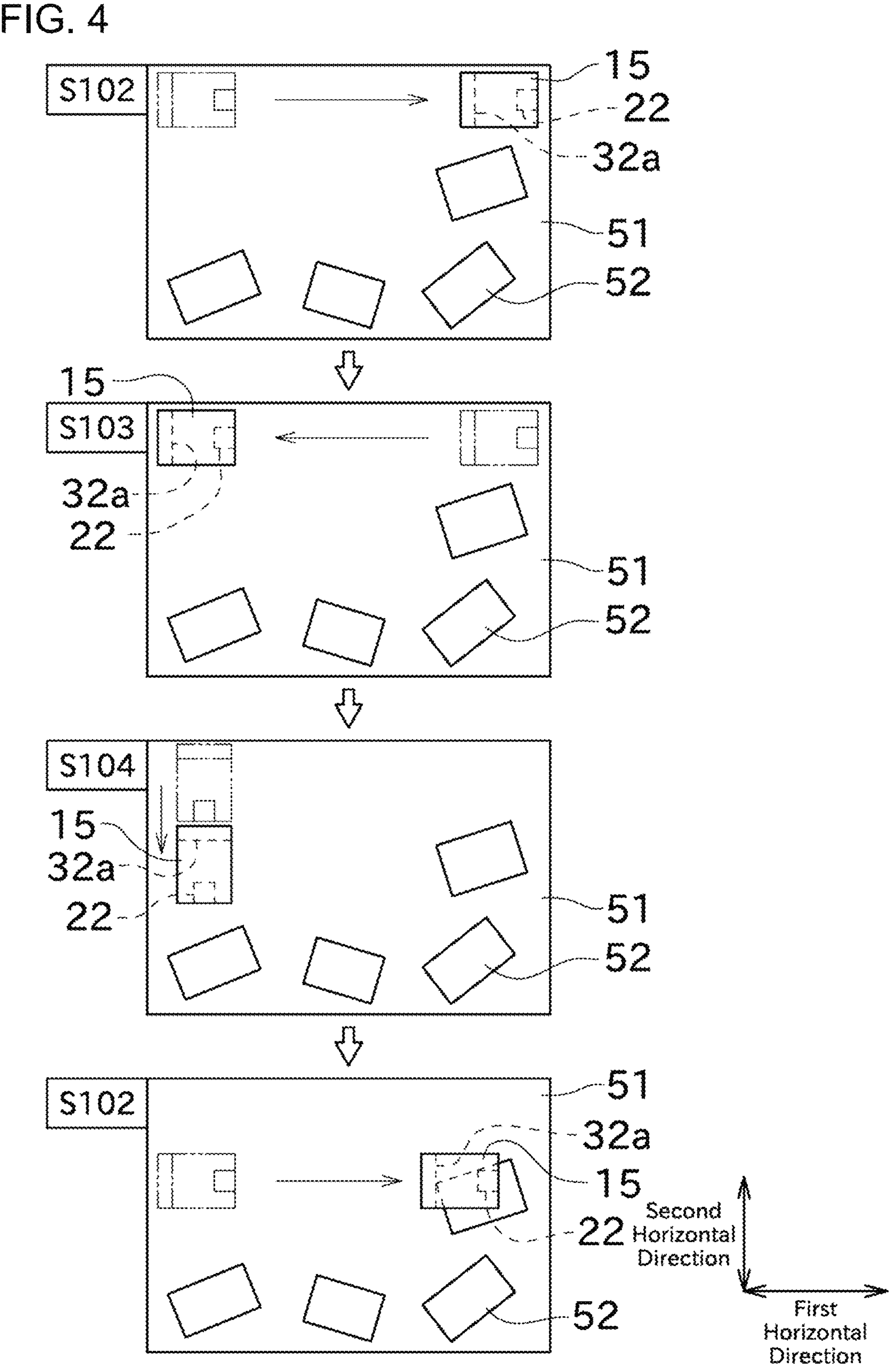
FIG. 4 is a diagram showing a process of searching for a workpiece in a plane.

FIG. 3 shows a flowchart for performing the workpiece search. The flowchart shown in FIG. 3 is executed by the controller 40. In the following description, for example, that the controller changes the position and orientation of the hand 15 by controlling the actuator 14 with reference to the value obtained by the encoder 13 is expressed as, simply, that the controller 40 changes the position and orientation of the hand 15.

First, the controller 40 sets the hand 15 at an initial height (S101). The initial height is a height at which the hand 15 is placed when starting the workpiece search. In the present embodiment, since the workpiece search is performed in order from the highest position to the lowest position, the initial height is the highest of the heights at which the search is performed.

Next, the controller 40 searches the inside of the container 51 entirely at the initial height. In the following description, two directions that cross each other at right angles in a horizontal plane are referred to as a first horizontal direction and a second horizontal direction. The first horizontal direction and the second horizontal direction can also be expressed as crossing each other at right angles in a plane parallel to the bottom face of the container 51. If the container 51 is cuboid, the first horizontal direction and the second horizontal direction may be defined to be parallel to the sides of the container 51. The directions for defining the first horizontal direction and the second horizontal direction are not limited to this.

The controller 40 moves the hand 15 in the first horizontal direction to search for the workpiece 52 (S102). At this time, as shown in FIG. 4, the hand 15 is moved with such an orientation that the attraction pad 22 is positioned ahead of the detection surface **32*a*. To be positioned ahead means to be positioned downstream in the direction of movement. Accordingly, at the time when the sensor 32 detects the workpiece 52, the attraction pad 22 can be positioned above the workpiece 52**.

The positional relation between the attraction pad 22 and the sensor 32 during the workpiece search may differ from that of the present embodiment. For example, the workpiece 52 may be searched for with the sensor 32 positioned ahead. In this case, firstly, the orientation of the hand 15 is adjusted according to the workpiece 52 and, after that, the hand 15 is translated so that the attraction pad 22 is positioned above the workpiece 52.

Next, the controller 40 moves the hand 15 back to the position at which the search in step S102 was started (S103). The workpiece 52 in this path has already been searched for. Therefore, the controller 40 moves the hand 15 back to the original position without changing the orientation of the hand 15.

Next, the controller 40 moves the hand 15 in the second horizontal direction to search for the workpiece 52 (S104). Before starting to move the hand 15 in the second horizontal direction, the controller 40 rotates the hand 15 to position the attraction pad 22 ahead of the detection surface 32*a*.

Next, the controller 40 determines whether the search at the present height is finished (S105). As this moment, the entire container 51 in plan view has not been completely searched. Therefore, the controller 40 performs the processes of step S102 to S104 again. In this manner, by repeating the processes of step S102 to S104, the search at the same height is continued.

After that, when the entire container 51 is completely searched at the present height, the controller 40 determines whether the container 51 has been searched to the bottom (S106). The distance from the initial height to the bottom of the container 51 is registered in advance in the controller 40 or the like.

Figure 5:
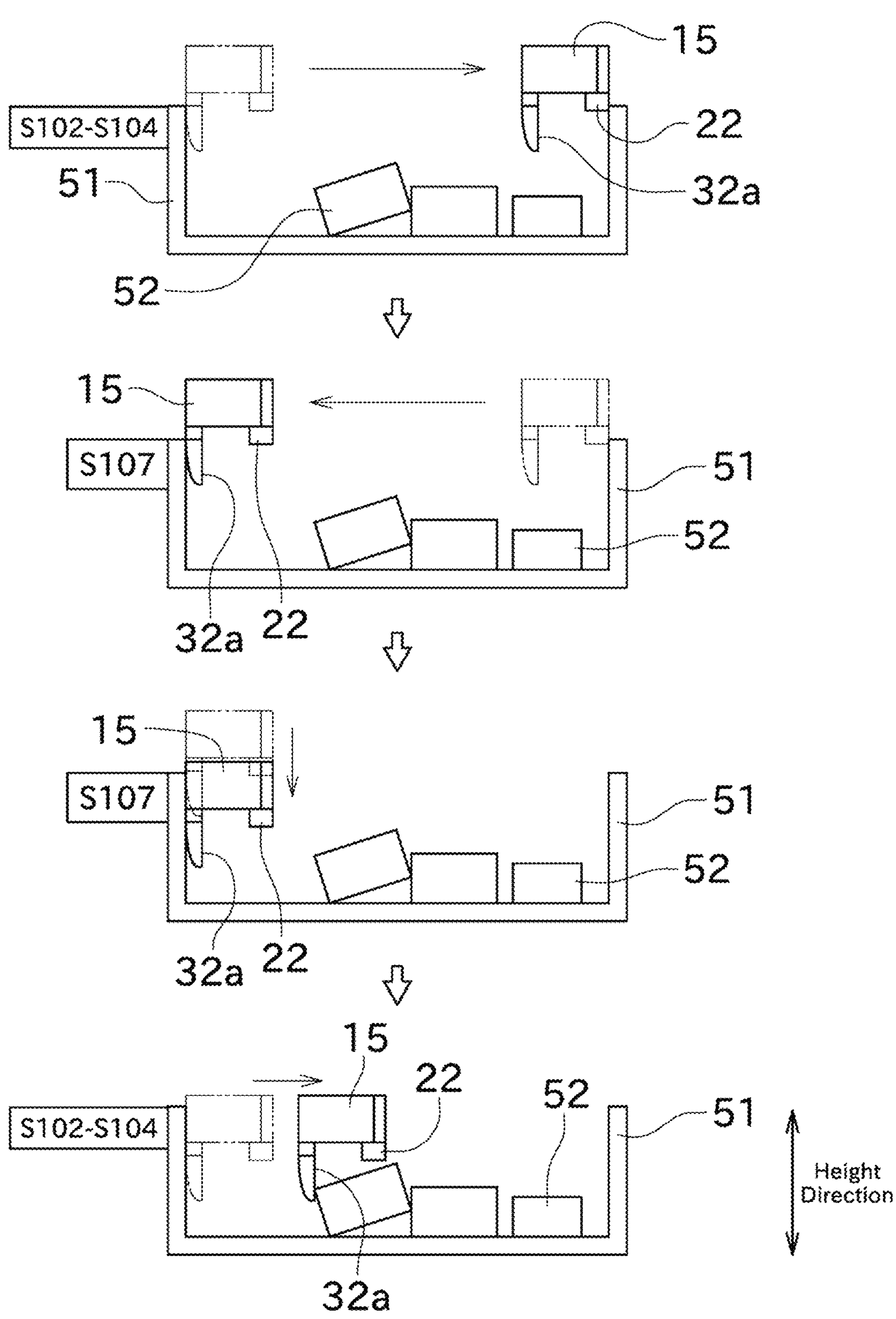
FIG. 5 is a diagram showing a process of searching for a workpiece while changing a height of a hand.

If the container 51 has not been searched to the bottom, the controller 40 moves the hand 15 to the position at which the search was started and lowers it (S107, FIG. 5). The controller 40 then repeats the processes of step S102 to S106 again. Then, when it determines that the container 51 has been searched to the bottom, it terminates the process.

Figure 6:
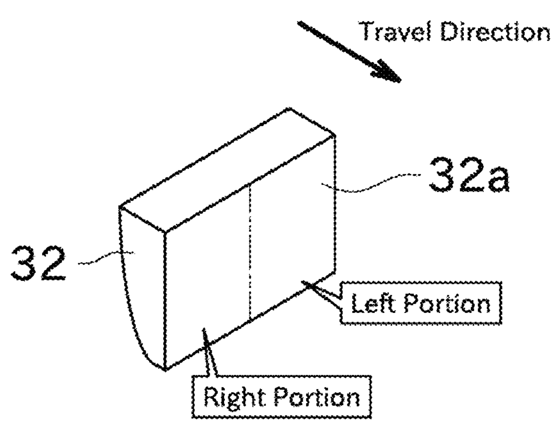
FIG. 6 is a diagram illustrating classification of positions of detection surfaces.
Figure 6:
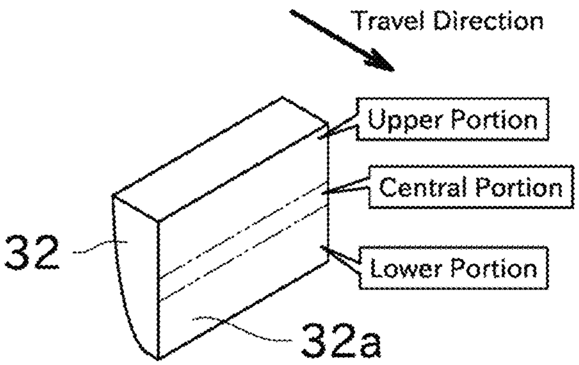

Next, with reference to FIG. 6 to FIG. 8, a process of changing the orientation of the hand 15 according to the orientation of the workpiece 52 when the workpiece 52 is detected during the workpiece search will be described below.

For ease of comprehension, in the following description, a process of changing the orientation of the hand 15 with respect to the workpiece 52 in plan view and a process of changing the orientation of the hand 15 with respect to the workpiece 52 in side view will be described separately.

The workpiece 52 is irregularly arranged in the container 51. Therefore, the orientation of the hand 15 with respect to the workpiece 52 at a time when the workpiece 52 is detected may not be always appropriate. Thus, the controller 40 changes the orientation of the hand 15 to adjust it appropriately with respect to the workpiece 52. That the orientation of the hand 15 with respect to the workpiece 52 is appropriate means that the attraction pad 22 and the workpiece 52 overlaps with each other in plan view and the attraction pad 22 can make surface contact with a plane face of the workpiece 52.

First, the process of changing the orientation of the hand 15 with respect to the workpiece 52 in plan view will be described below. As shown in FIG. 6, the detection surface 32*a* is divided into a left portion and a right portion. The right side and the left side when heading in the travel direction are the right portion and the left portion, respectively. As described above, since multiple tactile sensors are arranged on the detection surface 32*a*, the controller 40 can determine whether the workpiece 52 has been brought into contact with the left portion or the right portion of the detection surface 32*a*. At this point, basically, the workpiece 52 and the detection surface 32*a* make line contact with each other.

Figure 7:
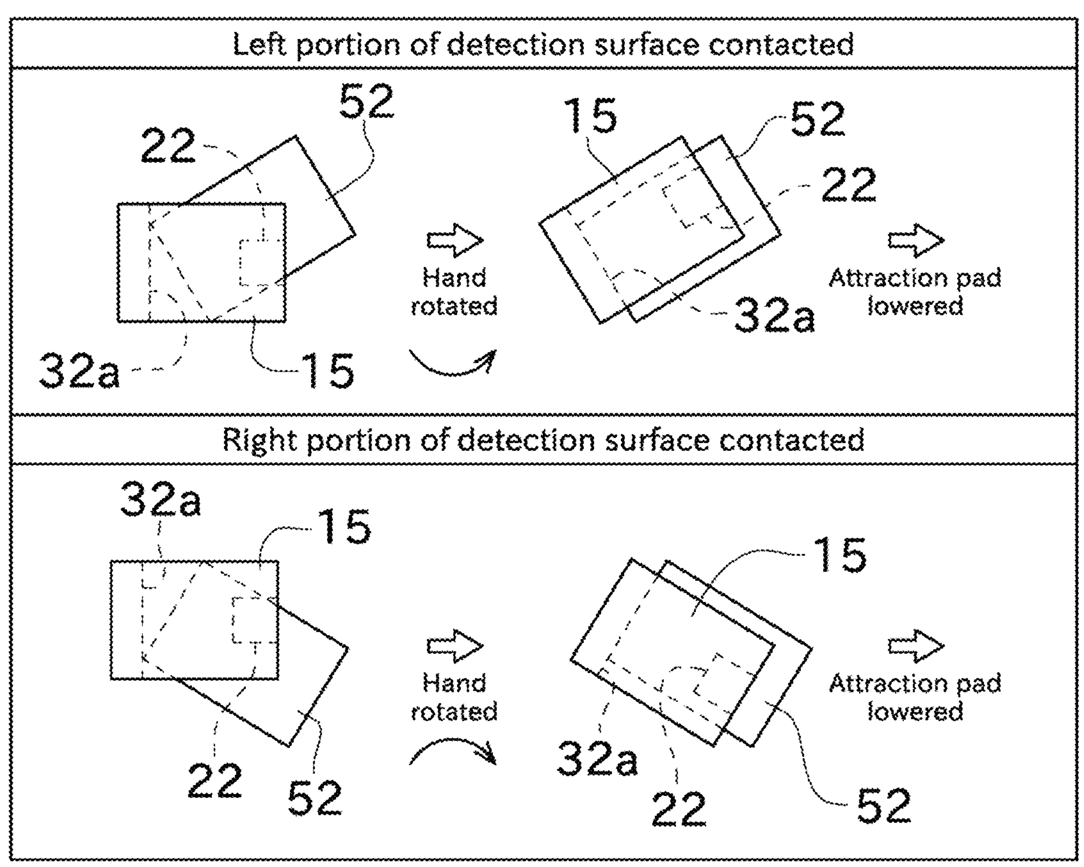
FIG. 7 is a diagram showing a process of changing an orientation of a hand by rotating the hand with a height direction as a center of rotation according to a position where a detection surface and a workpiece contact.
Figure 7:
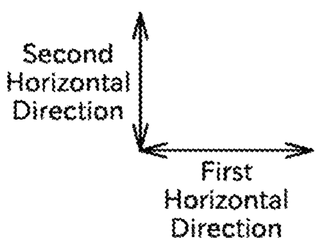

As shown in FIG. 7, if the workpiece 52 has been brought into contact with the left portion of the detection surface 32*a*, the controller 40 rotates the hand 15 with a height direction as a height direction as a center of rotation. Specifically, a position at which the workpiece 52 and the detection surface 32*a* contact with each other is set as the center of rotation. In the present embodiment, the hand 15 is rotated in such a direction that the right portion of the detection surface 32*a* approaches the workpiece 52. Accordingly, with the progress of the rotation of the hand 15, the right portion of the detection surface 32*a* approaches the workpiece 52 and then the right portion of the detection surface 32*a* makes contact with the workpiece 52. As a result, the detection surface 32*a* can be brought into surface contact with the workpiece 52.

On the other hand, if the workpiece 52 has been brought into contact with the right portion of the detection surface 32*a*, with a position at which they contact with each other as the center of rotation, the controller 40 rotates the hand 15 in such a direction that the left portion of the detection surface 32*a* approaches the workpiece 52. Accordingly, the detection surface 32*a* can be brought into surface contact with the workpiece 52.

In the above-described manner, by changing the orientation of the hand 15 with respect to the workpiece 52 in plan view, the controller 40 brings the detection surface 32*a* into surface contact with the workpiece 52. Then, while maintaining the surface contact, the controller 40 controls the lifting apparatus 21 to lower it and attracts and holds the workpiece 52 by the attraction pad 22.

The position of the center of rotation is not limited to the position at which they contact with each other. For example, if there is a possibility of interference from a wall of the container 51 or the like, the hand 15 may be rotated after being moved backward. The direction of rotation is not limited to the above-mentioned directions. For example, if the workpiece 52 has been brought into contact with the left portion of the detection surface 32*a*, the hand 15 may be rotated in such a direction that the left end of the detection surface 32*a* approaches the workpiece 52. In this case, since the positions of the attraction pad 22 and the workpiece 52 can be misaligned, the hand 15 may be translated along the workpiece 52 after the detection surface 32*a* is brought into surface contact with the workpiece 52.

Next, the process of changing the orientation of the hand 15 with respect to the workpiece 52 in side view will be described below. As shown in FIG. 6, the detection surface 32*a* is divided into an upper portion, a central portion, and a lower portion. The upper portion is an upper side in the height direction with respect to the central portion and the lower portion is a lower side in the height direction with respect to the central portion. The controller 40 can determine whether the workpiece 52 has been brought into contact with the upper portion of the detection 32*a*, whether with the central portion, and whether with the lower portion.

Figure 8:
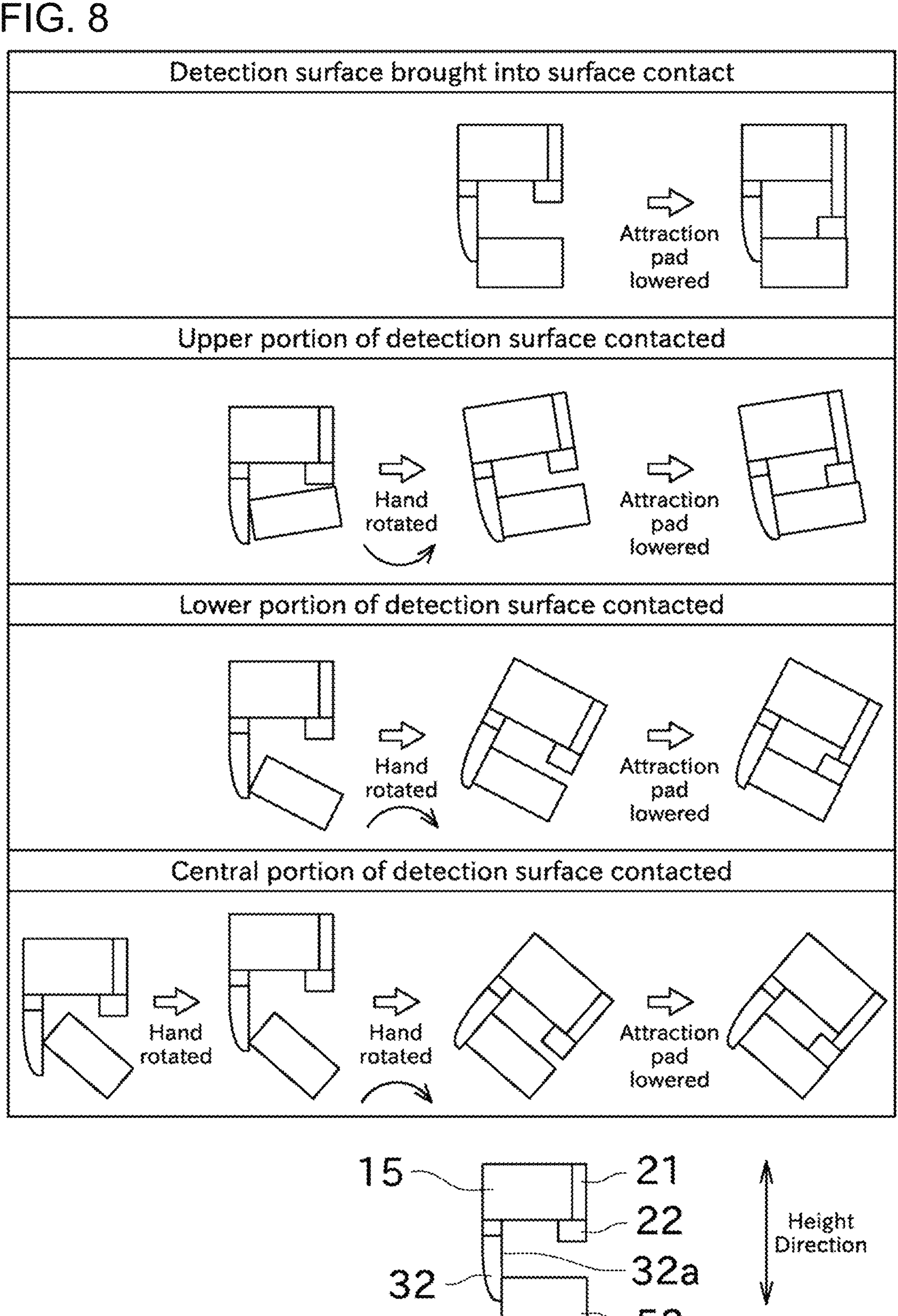
FIG. 8 is a diagram showing a process of changing an orientation of a hand by rotating the hand with a horizontal direction as a center of rotation according to a position where a detection surface and a workpiece contact.

As shown in FIG. 8, if the workpiece 52 has been brought into surface contact with the detection surface 32*a*, the orientation of the hand 15 with respect to the workpiece 52 in side view is appropriate. Therefore, without changing the orientation of the hand 15, the controller 40 controls the lifting apparatus 21 to lower it and attracts and holds the workpiece 52 by the attraction pad 22.

If the workpiece 52 has been brought into contact with the upper portion of the detection surface 32*a*, the controller 40 rotates the hand 15 with a horizontal direction as the center of rotation. Specifically, a position where the workpiece 52 and the detection surface 32*a* contact with each other is set as the center of rotation. In the present embodiment, the hand 15 is rotated in such a direction that the lower portion of the detection surface 32*a* approaches the workpiece 52. Accordingly, with the progress of the rotation of the hand 15, the lower portion of the detection surface 32*a* approaches the workpiece 52 and then the lower portion of the detection surface 32*a* makes contact with the workpiece 52. In this manner, the detection surface 32*a* can be brought into surface contact with the workpiece 52. Then, while maintaining the surface contact, the controller 40 controls the lifting apparatus 21 to lower it and attracts and holds the workpiece 52 by the attraction pad 22.

If the workpiece 52 has been brought into contact with the lower portion of the detection surface 32*a*, with a position at which they contact with each other as the center of rotation, the controller 40 rotates the hand 15 in such a direction that the upper portion of the detection surface 32*a* approaches the workpiece 32*a*. Accordingly, the detection surface 32*a* can be brought into surface contact with the workpiece 52. Then, while maintaining the surface contact, the controller 40 controls the lifting apparatus 21 to lower it and attracts and holds the workpiece 52 by the attraction pad 22.

If the workpiece 52 has been brought into contact with the central portion of the detection surface 32*a*, an appropriate direction in which the hand 15 should be rotated cannot be determined. Therefore, the controller 40 raises the hand 15. The controller 40 then performs the same process as when the workpiece 52 contacts with the lower portion of the detection surface 32*a*. If there is no possibility of interference between the hand 15 and the workpiece 52, the hand 15 may also be lowered. The controller 40 then performs the same process as when the workpiece 52 contacts with the upper portion of the detection surface 32*a*.

Even in the process of changing the orientation of the hand 15 with respect to the workpiece 52 in side view, the position of the center of rotation is not limited to the position at which they contact with each other. The direction of rotation is also not limited to the above-mentioned directions. The workpiece 52 may be classified into the upper portion and the lower portion while omitting the center portion.

In the process of changing the orientation of hand 15 with respect to the workpiece 52 in plan view or side view, the controller 40 may retract the hand 15 before rotating the hand 15 when it determines that the hand 15 and another member, especially the container 51 or the workpiece 52, will interfere each other. To perform this process, the position of the container 51 may be registered in advance in the controller 40. Alternatively, a detection apparatus that examines the surrounding of the hand 15 may be arranged. The detection apparatus is, for example, a radar or a sonar.

When the picking-up task is actually performed, the orientation of the hand 15 with respect to the workpiece 52 in plan view and in side view may not be appropriate. In this case, the workpiece 52 and the detection surface 32*a* make point contact with each other. In this situation, the orientation of the hand 15 with respect to the workpiece 52 in plan view may be changed with the method shown in FIG. 7 first and then the orientation of the hand 15 with respect to the workpiece 52 in side view may be changed with the method shown in FIG. 8. The order of the two processes may be swapped.

As described above, the robot system 1 of the present embodiment includes the robot 10, the attraction pad 22, the sensor 32, and the controller 40. The robot 10 includes the hand 15 whose orientation is changeable. The attraction pad 22 is attached to the hand 15, attracts the workpiece 52, and holds the workpiece 52. The sensor 32 is attached to the hand 15, includes the detection surface 32*a*, and detects contact between the detection surface 32*a* and the workpiece 52. The controller 40 can determine whether the workpiece 52 has been brought into surface contact with the detection surface 32*a* based on the results of detection made by the sensor 32 and changes the orientation of the hand 15, until the workpiece 52 makes surface contact with the detection surface 32*a*, and then makes the attraction pad 22 hold the workpiece 52.

By bringing the workpiece 52 into surface contact with the detection surface 32*a*, the hand 15 can be adjusted to a predetermined orientation with respect to the workpiece 52. Therefore, the workpiece 52 can be properly attracted and held by using the attraction pad 22.

In the robot system 1 of the present embodiment, when the controller 40 determines that the workpiece 52 is not in surface contact with the detection surface 32*a*, the controller 40 changes the orientation of the hand 15 until the workpiece 52 makes surface contact with the detection surface 32*a*.

Accordingly, the detection surface 32*a* can be surely brought into surface contact with the workpiece 52.

In the robot system 1 of the present embodiment, the controller 40 changes the orientation of the hand 15 by rotating the hand 15 with a horizontal direction as the center of rotation.

Accordingly, the orientation of the hand 15 in plan view can be adjusted according to the workpiece 52.

In the robot system 1 of the present embodiment, the detection surface 32*a* includes the upper portion and the lower portion which is located lower than the upper portion. When the controller 40 determines that the workpiece 52 has been brought into contact with the lower portion of the detection surface 32*a*, the controller 40 rotates the hand 15 in such a direction that the upper portion of the detection surface 32*a* approaches the workpiece 52. When the controller 40 determines that the workpiece 52 has been brought into contact with the upper portion of the detection surface 32*a*, the controller 40 rotates the hand 15 in such a direction that the lower portion of the detection surface 32*a* approaches the workpiece 52.

Accordingly, the hand 15 can be rotated in such a direction that the orientation of the hand 15 in side view becomes appropriate.

In the robot system 1 of the present embodiment, the detection surface 32*a* includes the central portion which is located between the upper portion and the lower portion. When the controller 40 determines that the workpiece 52 has been brought into contact with the central portion of the detection surface 32*a*, the controller 40 raises the hand 15 and then rotates the hand 15 in such a direction that the upper portion of the detection surface 32*a* approaches the workpiece 52.

Accordingly, the hand 15 can be rotated in an appropriate direction while preventing the interference between the hand 15 and the workpiece 52.

In the robot system 1 of the present embodiment, the controller 40 changes the orientation of the hand 15 by rotating the hand 15 with a vertical direction as the center of rotation.

Accordingly, the orientation of the hand 15 in side view can be adjusted according to the workpiece 52.

In the robot system 1 of the present embodiment, the controller 40 searches for the workpiece 52 by translating the hand 15 in a horizontal direction and, when the sensor 32 detects the workpiece 52, the controller 40 changes the orientation of the hand 15 until the workpiece 52 makes surface contact with the detection surface 32*a*.

Accordingly, even if the workpiece 52 is irregularly arranged, the workpiece 52 can be held.

In the robot system 1 of the present embodiment, the controller 40 searches for the workpiece 52 with the attraction pad 22 and the sensor 32 aligned in the direction of movement and with the attraction pad 22 positioned downstream of the sensor 32 in the direction of movement.

Accordingly, the workpiece 52 will be positioned under the attraction pad 22 when the detection surface 32*a* is brought into surface contact with the workpiece 52.

In the robot system 1 of the present embodiment, the controller 40 changes the orientation of the hand 15, until the workpiece 52 makes surface contact with the detection surface 32*a*, and then makes the attraction pad 22 hold the workpiece 52 while maintaining the surface contact between the workpiece 52 and the detection surface 32*a*.

Accordingly, the attraction pad 22 can hold the workpiece 52 with the appropriate orientation of the hand 15 with respect to the workpiece 52 maintained.

While the preferred embodiment of the present application has been described above, the configurations explained above may be modified, for example, as follows.

Figure 9:
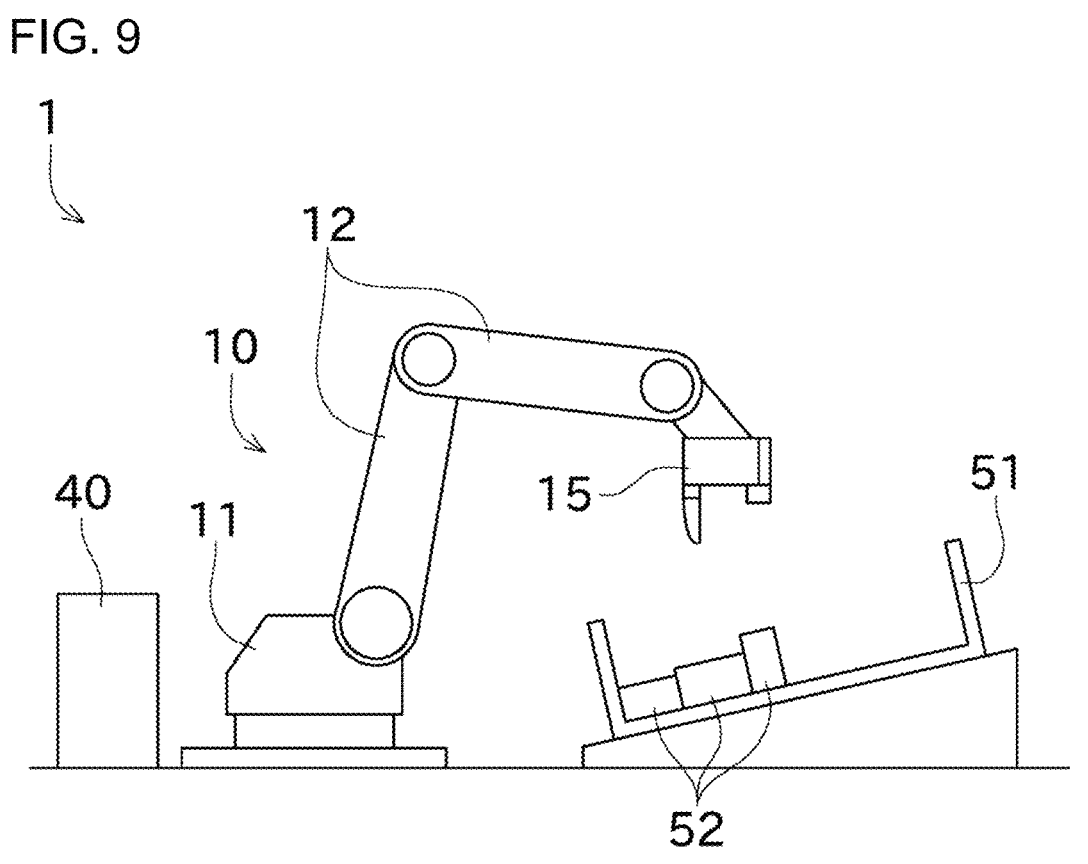

In the above-described embodiment, the container 51 is arranged horizontally. Alternatively, as shown in FIG. 9, the container may be arranged in a tilted manner. Accordingly, since the workpieces 52 can be gathered at a lower positions, the hand 15 can be less likely to interfere with the workpiece 52. The direction of tilt may be, for example, such a direction that the end closer to the robot 10 becomes lower than the end further from the robot 10. Accordingly, the workpieces 52 can be collected closer to other workpieces 52.

The flowchart shown in the above-described embodiment is disclosed just as an example and some processes may be omitted, the contents of some processes may be changed, or a new process may be added.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A robot system comprising:

a robot that includes a hand whose orientation is changeable;

an attraction pad that is attached to the hand, attracts a workpiece, and holds the workpiece;

a sensor that is attached to the hand, includes a detection surface, and detects contact between the detection surface and the workpiece; and a controller that can determine whether the workpiece is brought into surface contact with the detection surface based on a result of detection made by the sensor and changes the orientation of the hand, until the workpiece makes surface contact with the detection surface, and then makes the attraction pad hold the workpiece, wherein the detection surface includes an upper portion and a lower portion which is located lower than the upper portion, in response to determining that the workpiece is brought into contact with the lower portion of the detection surface by detecting a sensed contact within the lower portion, the controller rotates the hand in such a direction that the upper portion of the detection surface approaches the workpiece, and in response to determining that the workpiece is brought into contact with the upper portion of the detection surface by detecting a sensed contact within the upper portion, the controller rotates the hand in such a direction that the lower portion of the detection surface approaches the workpiece.

2. The robot system according to claim 1, wherein, when the controller determines that the workpiece is not in surface contact with the detection surface, the controller changes the orientation of the hand until the workpiece makes surface contact with the detection surface.

3. The robot system according to claim 1, wherein the controller changes the orientation of the hand by rotating the hand with a horizontal direction as a center of rotation.

4. The robot system according to claim 1, wherein the detection surface includes a central portion which is located between the upper portion and the lower portion, and wherein, when the controller determines that the workpiece is brought into contact with the central portion of the detection surface, the controller raises the hand and then rotates the hand in such a direction that the upper portion of the detection surface approaches the workpiece.

5. The robot system according to claim 1, wherein the controller changes the orientation of the hand by rotating the hand with a vertical direction as a center of rotation.

6. The robot system according to claim 1, wherein the controller searches for the workpiece by translating the hand in a horizontal direction and, when the sensor detects the workpiece, the controller changes the orientation of the hand until the workpiece makes surface contact with the detection surface.

7. The robot system according to claim 6, wherein the controller searches for the workpiece with the attraction pad and the sensor aligned in a direction of movement and with the attraction pad positioned downstream of the sensor in the direction of movement.

8. The robot system according to claim 1, the controller changes the orientation of the hand, until the workpiece makes surface contact with the detection surface, and then makes the attraction pad hold the workpiece while maintaining the surface contact between the workpiece and the detection surface.

9. A robot system comprising:

a robot that includes a hand whose orientation is changeable;

an attraction pad that is attached to the hand, attracts a workpiece, and holds the workpiece;

a sensor that is attached to the hand, includes a detection surface, and detects contact between the detection surface and the workpiece; and a controller that can determine whether the workpiece is brought into surface contact with the detection surface based on a result of detection made by the sensor and changes the orientation of the hand, until the workpiece makes surface contact with the detection surface, and then makes the attraction pad hold the workpiece, wherein the detection surface includes a left portion and a right portion which is located next to the left portion, in response to determining that the workpiece is brought into contact with the left portion of the detection surface by detecting a sensed contact within the left portion, the controller rotates the hand in such a direction that the right portion of the detection surface approaches the workpiece, and in response to determining that the workpiece is brought into contact with the right portion of the detection surface by detecting a sensed contact within the right portion, the controller rotates the hand in such a direction that the left portion of the detection surface approaches the workpiece.

* * * * *